(12) United States Patent
Yacoub et al.

(10) Patent No.: US 7,756,871 B2
(45) Date of Patent: Jul. 13, 2010

(54) ARTICLE EXTRACTION

(75) Inventors: Sherif Yacoub, Mountain View, CA (US); Jean-Manuel Van Thong, Arlington, MA (US); John Burns, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 476 days.

(21) Appl. No.: 10/964,094

(22) Filed: Oct. 13, 2004

(65) Prior Publication Data

US 2006/0080309 A1 Apr. 13, 2006

(51) Int. Cl.
*G06F 7/00* (2006.01)
*G06F 17/30* (2006.01)
(52) U.S. Cl. .................. 707/736; 707/758; 707/899
(58) Field of Classification Search ............... 707/4, 707/3, 1, 10, 899, 755; 709/217; 698/202, 698/203, 206, 226; 382/176, 175, 173, 180; 715/525
See application file for complete search history.

(56) References Cited

U.S. PATENT DOCUMENTS

| 5,418,864 | A | * | 5/1995 | Murdock et al. ............ 382/309 |
| 5,642,520 | A | * | 6/1997 | Takeshita et al. ............... 704/3 |
| 5,784,487 | A | * | 7/1998 | Cooperman ................. 382/175 |
| 5,848,184 | A | * | 12/1998 | Taylor et al. ................. 382/173 |
| 5,892,842 | A | * | 4/1999 | Bloomberg ................. 382/173 |
| 5,907,631 | A | * | 5/1999 | Saitoh ......................... 382/176 |
| 5,956,422 | A | * | 9/1999 | Alam .......................... 382/181 |
| 5,987,171 | A | * | 11/1999 | Wang .......................... 382/173 |
| 6,289,121 | B1 | * | 9/2001 | Abe et al. .................... 382/175 |
| 6,460,036 | B1 | | 10/2002 | Herz ........................... 707/10 |
| 6,738,780 | B2 | | 5/2004 | Lawrence et al. ........... 707/101 |
| 6,785,416 | B1 | * | 8/2004 | Yu et al. ...................... 382/176 |
| 6,907,431 | B2 | * | 6/2005 | Lin .................................. 1/1 |
| 7,050,630 | B2 | * | 5/2006 | Simske et al. ............... 382/176 |
| 2002/0022956 | A1 | * | 2/2002 | Ukrainczyk et al. ............ 704/9 |
| 2003/0208502 | A1 | * | 11/2003 | Lin ............................. 707/101 |
| 2004/0054670 | A1 | | 3/2004 | Noff et al. ....................... 707/3 |
| 2004/0086179 | A1 | * | 5/2004 | Ma et al. ..................... 382/177 |
| 2004/0117725 | A1 | * | 6/2004 | Chen et al. .................. 715/500 |
| 2006/0031764 | A1 | * | 2/2006 | Keyser et al. ............... 715/525 |
| 2006/0204096 | A1 | * | 9/2006 | Takebe et al. ............... 382/180 |

FOREIGN PATENT DOCUMENTS

| AU | 9863515 | | 11/1998 |
| CA | 2335801 | | 5/2002 |
| JP | 2002108847 | A * | 4/2002 |
| JP | 2004166062 | | 6/2004 |

OTHER PUBLICATIONS

Julian Kupiec, A Trainable Document Summarizer, 1995, ACM, New York, NY. pp. 68-73.*

Claudie Faure, Preattentive Reading and Selective Attention for Document Image Analysis,1999, IEEE Computer Society Washington, DC, USA, Proceedings of the Fifth International Conference on Document Analysis and Recognition.*

(Continued)

*Primary Examiner*—John R. Cottingham
*Assistant Examiner*—Hexing Liu

(57) ABSTRACT

An article is extracted from a document using a decision combiner to process a plurality of reading order alternatives. The text flow analysis generates the plurality of reading order alternatives of separate body text regions.

28 Claims, 6 Drawing Sheets

OTHER PUBLICATIONS

Scott E. Brodie, "Extra-geometric" proofs of the Pythagorean Theorem, Oct. 21, 1998, Alexander Bogomolny, http://www.cut-the-knot.org/pythagoras/PTcom3.shtml.*

Aiello, Marco, et al., "Document Understanding for a Broad Class of Documents", *International Journal of Document Analysis and Recognition IJDAR*, 5(1), (2002),1-16.

Allen, James F., "Maintaining knowledge about temporal intervals", *Communications of the ACM*, 26(11), (Nov. 1983),832-843.

Haralick, R M., "Document image understanding: geometric and logical layout", *1994 IEEE Computer Society Conference on Computer Vision and Pattern Recognition*, (Jun. 21-23, 1994),385-390.

Masataki, H , et al., "Variable-order N-gram generation by word-class splitting and consecutive word grouping", *ICASSP-96. Conference—Acoustics, Speech, and Signal Processing*, (May 7-10, 1996),188-191.

Nadler, Morton , "SURVEY Document Segmentation and Coding Techniques", *Computer Vision, Graphics, and Image Processing*, 28, (1984),240-262.

Tsujimoto, S , et al., "Understanding multi-articled documents", *10th International Conference on Pattern Recognition, 1990. Proceedings*, (Jun. 16-21, 1990),551-556.

* cited by examiner

ARTICLE EXTRACTION

TECHNICAL FIELD

Embodiments of the present subject matter relate to article extraction from a document.

BACKGROUND

Publishers are often interested in the conversion of large collections of paper-based documents into digital forms that are suitable for electronic archival purposes and digital libraries. Paper documents may be scanned and converted into digital high-resolution images. These digitial high-resolution images may not be suitable for electronic archival purposes and digital libraries without human intervention to correct and format the images. With a large volume of the material being processed, it becomes increasingly costly to include human beings in the process to correct the automated recognition processes.

DETAILED DESCRIPTION

The following description includes terms, such as "up", "down", "upper", "lower", "first", "second", etc. that are used for descriptive purposes only and are not to be construed as limiting. The embodiments of a device or article of the present invention described herein can be manufactured, used, or shipped in a number of positions and orientations.

The functions or algorithms described herein are implemented in hardware, and/or software in embodiments. The software comprises computer executable instructions stored on computer readable media such as memory or other types of storage devices. The term "computer readable media" is also used to represent software-transmitted carrier waves. Further, such functions correspond to modules, which are software, hardware, firmware, or any combination thereof. Multiple functions are performed in one or more modules as desired, and the embodiments described are merely examples. A digital signal processor, ASIC, microprocessor, or any other type of processor operating on a system, such as a personal computer, server, a router, or any other device capable of processing data including network interconnection devices executes the software.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

The term "document" used herein may refer to a multi-articled document, such as a magazine, a newspaper, a book, or any document with multiple sequential text regions, or "document" may refer to a single-articled document, such as a published paper, or a personal document such as a recipe. The document may span many pages, or may also be a single page, especially in the case where there are multiple image and/or text regions, or multiple articles on the single page.

The term "article" used herein may refer to a magazine or newspaper article, an essay, or any text based work in any medium of expression.

Overview

In an embodiment, large collections of paper-based documents are converted into digital forms suitable for electronic archival purposes, including digital libraries.

Embodiments include a method and system for a substantially complete solution of an automated, accurate, and reliable extraction of articles and identification of text reading order in a document. In embodiments discussed herein, articles in a scanned document are automatically identified with minimal user intervention, legacy paper documents are converted into electronic articles, multiple scoring schemes are utilized to identify a reading order in an article, and text regions, including title text regions, are stitched to correlate each region of the article.

Figure 1:
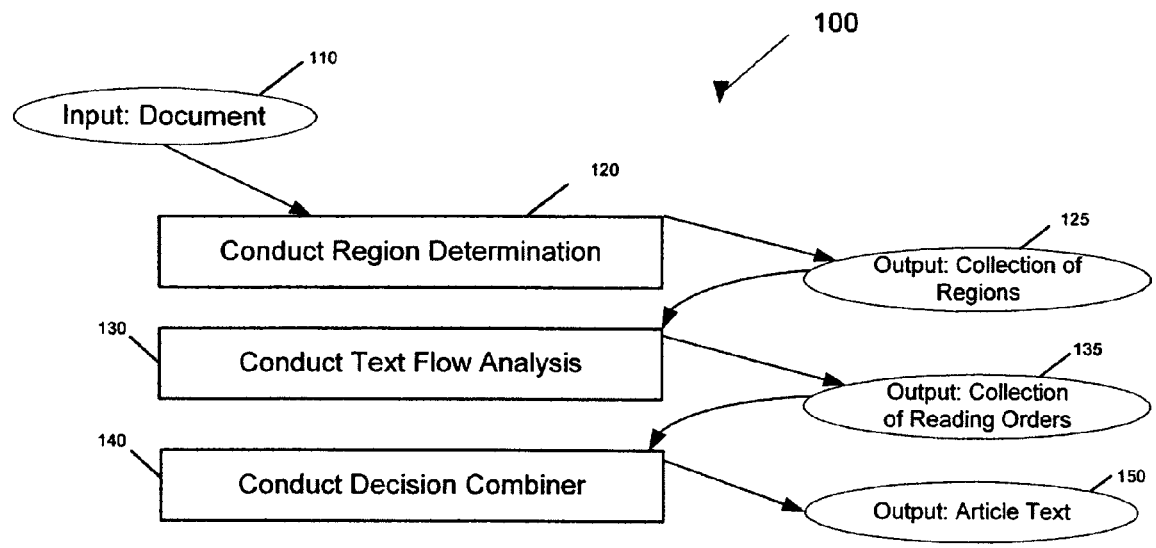
FIG. 1 illustrates an exemplary embodiment of a process to extract an article from a document.

FIG. 1 illustrates an embodiment of a process 100 to extract an article from a document. At block 110, a document is input into the process 100, in an embodiment. At block 120, the process conducts a region determination, in an embodiment. At block 125, the region determination renders an output of a collection of regions, in an embodiment. At block 130, the process 100 conducts a text flow analysis, in an embodiment. At block 125, the text flow analysis renders an output of a collection of reading orders, in an embodiment. At block 140, the process 100 conducts a decision combiner, in an embodiment. At block 150, the decision combiner outputs an article text of the document. In an additional embodiment, the process 100 is repeated for each of the articles in the document.

In an embodiment, the region determination and the text flow analysis are associated with a digital conversion process. In embodiments, the region determination is associated with document analysis, and the text flow analysis is associated with document understanding, as discussed in embodiments herein. In an embodiment, not shown, the region determination at block 120 is skipped. In an additional embodiment, the text flow analysis may include the region determination as one possible analysis of the one or more analyses in the text flow analysis at block 130.

In an embodiment, the results from the multi-method analysis are combined in the decision combiner to achieve substantially reliable article identification. The decision combiner is applied within each page and across document pages in embodiments. In an embodiment, the decision combiner is applicable to general types of scanned documents, with text and/or images. Several decision combiner embodiments are discussed herein.

Region Determination

Figure 2:
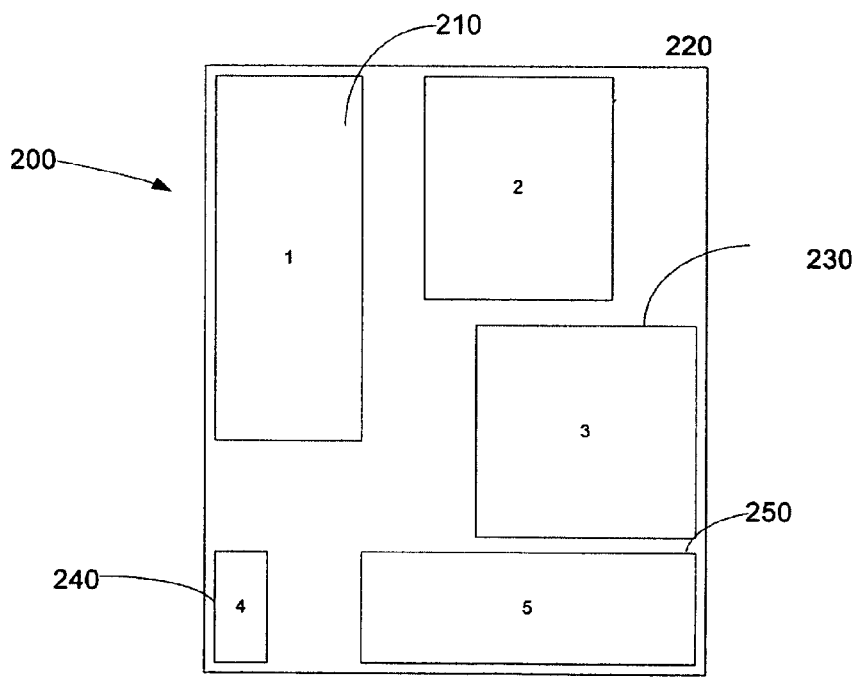
FIG. 2 illustrates an exemplary embodiment of a page subjected to a region determination.

FIG. 2 illustrates an exemplary embodiment of a source page 200 subjected to a region determination. In an embodiment, the source page 200 is scanned and processed using Optical Character Recognition (OCR) and region analysis components. The source page 200 is converted into raster electronic versions (i.e. digital high-resolution images). The region determination process may be referred to as extraction of the layout structure of the document.

In an embodiment, output data from the OCR process analysis engines includes: region bounding boxes and region types (graphic image or text). In further embodiments, if the region includes a text region, the text and the font information, such as a font type, a font size, and a type of emphasis, are included in the output data. In an exemplary embodiment, each source page 200 in the document is processed using this OCR process and an intermediate metadata file is generated describing the region and/or text information. In an exemplary embodiment, the metadata files are used to determine a layout-based analysis score in the text flow analysis, discussed herein.

In the exemplary embodiment of FIG. 2, the source page 200 is scanned and five example regions are found. The five regions include region 210, region 220, region 230, region 240, and region 250. In an embodiment, a plurality of separate body text regions and one or more title text regions are generated with the region determination process. In other embodiments, at least one region generated in the region determination is a graphic region.

Text Flow Analysis

Figure 3A:
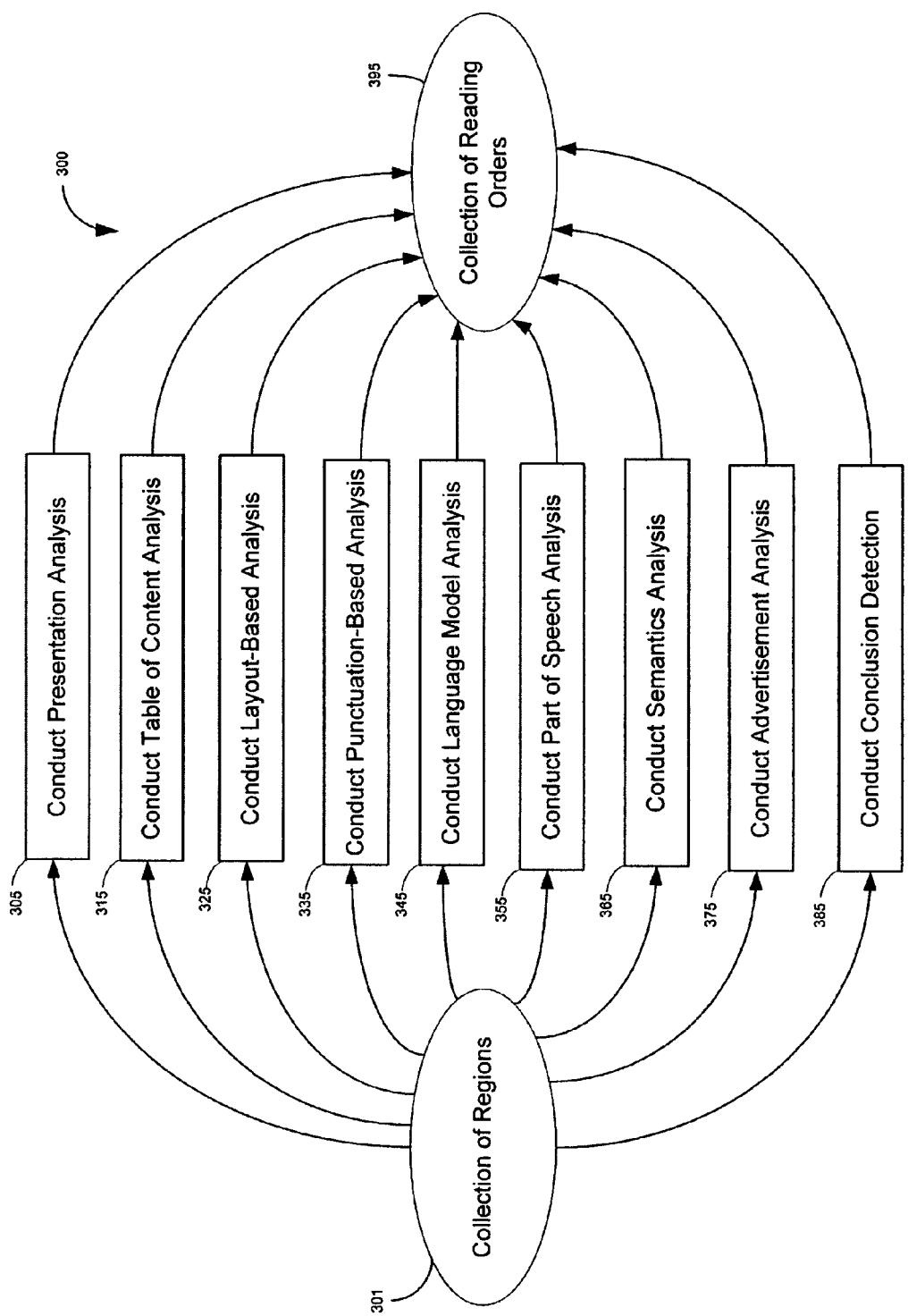
FIG. 3A illustrates an exemplary embodiment of a text flow analysis process.

FIG. 3A illustrates an embodiment of a text flow analysis process 300. In this exemplary process, there are one or more analyses conducted on the text regions generated in the region determination. In an embodiment, the text flow analysis is referred to as a document understanding process, wherein a logical structure, such as the title, header, page number, footer, author, and reference identification, of the document is extracted.

At block 301, the process 300 of FIG. 3A begins at start. At block 305, a presentation analysis of the text regions generated in the region determination is conducted, as discussed in more detail below. At least one reading order 1 at block 395 results from the presentation analysis.

In an embodiment the text flow analysis may move to block 315 to conduct a table of contents analysis, as discussed in more detail below, on the text regions generated in the region determination. At least one reading order 2 at block 395 results from the table of contents analysis.

In an exemplary embodiment, the text flow analysis may move to block 325 to conduct a layout-based analysis on the text regions generated in the region determination. As discussed in more detail below, the layout-based, analysis uses the metadata tiles generated in the region determination 120. At least one reading order 3 at block 395 results from the layout-based analysis.

In an exemplary embodiment, the text flow analysis may move to block 335 to conduct a punctuation-based analysis on the text regions generated in the region determination, as discussed in more detail below. At least one reading order 4 at block 195 results from the punctuation-based analysis.

In an exemplary embodiment, the text flow analysis may move to block 345 to conduct a language model analysis on the text regions generated in the region determination, as discussed in more detail below. At least one reading order 5 at block 395 results from the language model analysis.

In an exemplary embodiment, the text flow analysis may move to block 355 to conduct a part of speech analysis on the text regions generated in the region determination, as discussed in more detail below. At least one reading order 6 at block 395 results from the part of speech analysis.

In an exemplary embodiment, the text flow analysis may move to block 365 to conduct a semantics analysis on the text regions generated in the region determination, as discussed in more detail below. At least one reading order 7 at block 395 results from the semantics analysis.

In an exemplary embodiment, the text flow analysis may move to block 375 to conduct an advertisement analysis on the text regions generated in the region determination, as discussed in more detail below. At least one reading order 8 at block 395 results from the advertisement analysis.

In an exemplary embodiment, the text flow analysis may move to block 385 to conduct a conclusion analysis on the text regions generated in the region determination, as discussed in more detail below. At least one reading order 9 at block 395 results from the conclusion analysis.

In an exemplary embodiment, the text flow analysis may move to block 395 when done. In an embodiment, one or more analyses 305, 315, 325, 335, 345, 355, 365, 375, and 385 are conducted to generate reading orders, while others are skipped. In another embodiment, there is at least one additional analysis conducted in the text flow analysis, other than the particular analyses listed in FIG. 3A. In another embodiment, one or more analyses 305, 315, 325, 335, 345, 355, 365, 375, and 385 are combined to generate a corresponding reading order or a set of reading orders.

Figure 3B:
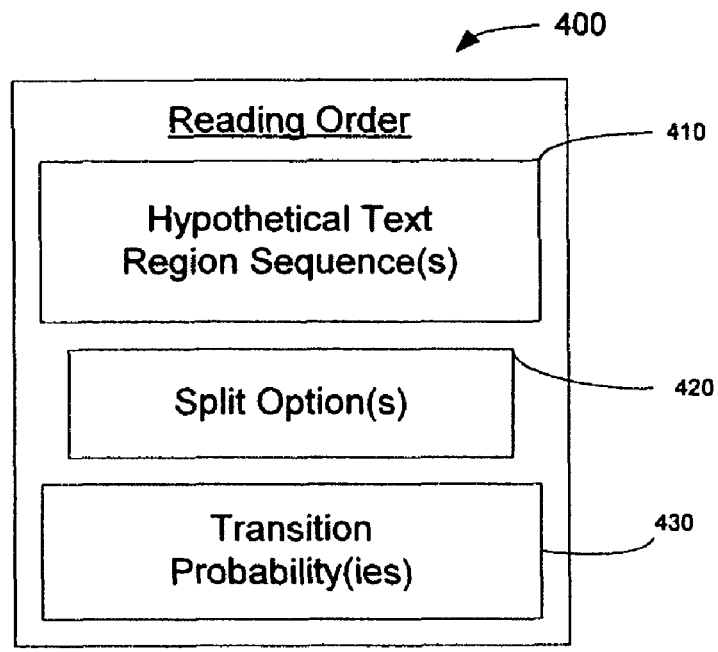
FIG. 3B illustrates an exemplary embodiment of a reading order generated in the text flow analysis process of FIG. 3A.

FIG. 3B illustrates an embodiment of a reading order generated in the text flow analysis process of FIG. 3A. For instance, the reading order 1 at block 395 includes a hypothetical text region sequence 410, such as (1, 4, 2, 3, 5), in an embodiment, there may be multiple reading order alternatives generated by a single analysis process, such as those generated by an exemplary layout-based analysis at block 325. Also, the reading order at block 395 may identify one or more hypothetical article sets or a split option at block 420, such as (1, 4, 2) (3, 5). In an embodiment, the split option may be zero, in that the particular text flow analysis suggests one article on that page. In another embodiment, the split option may be such that every separate text region may be suggested as an article. The at least one reading, order at block 395 may also have a transition probability associated with each transition between consecutive text regions in the hypothetical sequence or reading order. In an embodiment, the transition probability is considered a technique to score text flow in order to determine the reading order in the decision combiner.

In an embodiment, the text flow analysis may include a title detection analysis and may produce an associated start transition score. A combination of multiple methods may be used to generate reliable "start of article" information.

Presentation Analysis

An embodiment that may detect the title (or title text region) includes the Presentation analysis at block 305. In this embodiment, the layout structure of the document may be used to determine the start of an article. In addition, presentation information may also be used. In an embodiment, a set of properties are used to construct a text region property vector. The vector may be used, for example, to distinguish between different text regions and to associate text regions that are the same.

The vector may include font properties, line properties, and text density in an exemplary embodiment. The font properties may include size, type, and style. The style may include all bold, partial bold, no bold, all italic, partial italic, no italic, all underline, partial underline, no underline, all regular, partial regular, partial underline, in embodiments. For each style (bold, italic, underline, regular) a property with three possible enumerations is created (i.e. all, partial, and no). The line properties may include the number of lines in the text region. For instance, a title text region may include fewer lines, such as one to two lines, as compared with the body text region. The text density is defined as the number of words divided by an area of the bounding region. The text density is usually low for title regions as compared with the body text regions.

In an additional embodiment, a set of training data is used to train a classifier to distinguish between the title text region, the body text region, a header region, a footer region, and/or an advertisement region using the text region property vector. In this embodiment, a neural network model may be used or a decision tree may be used as the trained classifier for the input or source pages. In an embodiment, the presentation analysis process at block 305 generates output including labeling each text region identified by the region determination according to its type (title, body, footer, header, advertisement, etc). Alternatively, or in addition, the at least one reading order at block 310 is generated from the presentation analysis at block 305.

Table of Contents Analysis

An additional embodiment that may detect the title (or title text region) includes the Table of Contents (TOC) Analysis at block 315. This embodiment may be used alone, or in combination with the presentation analysis at block 305 above to generate the corresponding reading order(s). In an embodiment, the table of contents of the multi-article document is identified.

A set of text regions from the table of contents of the multi-article document is selected. In an embodiment, two types of identified text regions may be selected: (1) text regions that include more than five words of normal text, excluding from which words that are not in a dictionary database; and/or (2) text regions that contain pronouns. In an embodiment, the first text region may be a representation of the title of an article and the second text region may be the representation of the authors. The first text region from the TOC is chosen from regions of and matched against words in regions of previously identified text regions in the region determination and/or the Presentation Analysis at block 305. The text region on the page with a highest word match to text in the first text region of the TOC indicates that there is a "start of article" for that page and at that text region with the highest match. In embodiments where there is the second text region that includes pronouns, that second text region of the TOC is matched against the text in text regions adjacent to the identified "start of article" text region. The text region with a highest word match to text in the second text region of the TOC indicates that there is an author identified for that article and in that text region with the highest match. The table of contents analysis at block 310, in some embodiments, renders the reading order(s) 2 at block 320.

In embodiments where the text regions in the document include pronouns, for example, the analyzer may consider the region as a possible advertisement, and may analyze accordingly.

Layout-Based Analysis

The layout-based analysis at block 325 includes a transition score that is evaluated from geometrical information obtained from the region determination which is conducted within, for example, the OCR and/or other systems. In an embodiment, based on some basic assumptions about the possibility of reading order of text regions, the analyzer at block 325 generates a set of possible reading orders. For instance, one basic assumption might be that the text is English text, which is read from left to right and from top to bottom.

In a layout-based embodiment, there are several possible relationships between text regions on the source page to determine relative graphical positions: A precedes B, A meets B, A overlaps B, A starts B, A during B, A finishes B, A equals B, and the inverse of the set. See, for instance, J. Allen. Maintaining knowledge about temporal intervals. *Communications of the ACM*, 26(11):832-843. 1983. In an embodiment, a second dimension is added, such that the relative graphical positions of two text regions, horizontally (left to right) and vertically (top to bottom), are also considered.

Figure 3C:
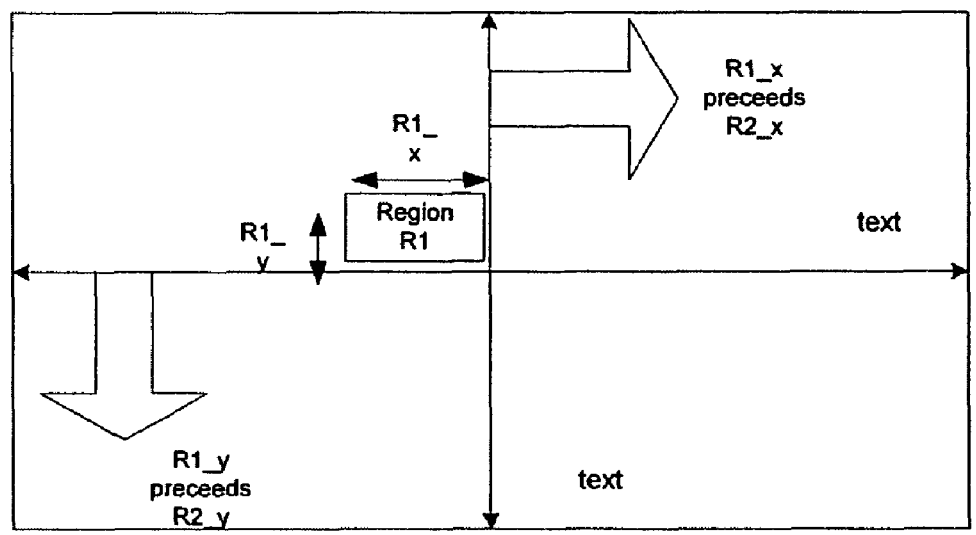
FIG. 3C illustrates an exemplary embodiment of the text flow analysis process.

For example, FIG. 3C illustrates a range for a first text region being sequentially before a second text region. In this embodiment, 1) text regions may not physically overlap; 2) English reading rules (above) apply; and 3) the top-left most region may be considered as a starting text region relative to a remainder of the source page in general. Then, applying this layout-based embodiment in two dimensions, region R1 is before region R2 in a reading order if $R1\_x$ precedes/meets $R2\_x$ or $R1\_y$ precedes/meets $R2\_y$.

In an embodiment, the layout-based analysis for the sample source page of FIG. 2 generates four hypothetical text region sequences (for the reading order alternatives). In an embodiment, the four alternatives are (1, 2, 3, 4, 5); (1, 2, 4, 3, 5); (1, 3, 4, 2, 5); and (1, 4, 2, 3, 5). In another embodiment for the sample FIG. 2, there can be as many as five factorial or 5! or 120 alternatives when no layout-based information is used to generate hypothetical text region sequences. The hypothetical text region sequences generated by the layout-based analysis may be used by other analyses of the text flow analysis, for instance, by the punctuation-based analysis at block 335.

The order of the hypothesized text regions may consider the layout within each page, and the page order. As a result, these considerations allow dramatic reduction in the number of possible transitions from any region. Both region layout and page order may be known with great precision, and therefore may be a reliable piece of information.

Punctuation-Based Analysis

In an embodiment, the punctuation-based analysis at block 335 determines scores or probabilities for each of the possible flows between text regions produced by the layout-based analyzer based on text punctuation information. In an embodiment, scores and/or probabilities range from 0 to 1.

The relationship between every two consecutive regions in each text flow alternative is analyzed in this embodiment. In this exemplary embodiment, the first text region in a particular sequence is referred to as an initial text region and the following text region is referred to as a target text region. In an embodiment, the last character ending a last line in the initial text region is extracted and the following characteristics are checked: (1) Word splits, (2) End of sentence indicator, and/or (3) Lack of punctuation.

For the "word splits" embodiment, if the last character includes a hyphen, "-", then a last word of the initial text region before the hyphen is extracted. In this exemplary instance, a first word of the target text region is also extracted. The two words are concatenated and the concatenated word is looked up in a dictionary. If the word is found in the dictionary, then the region sequence is highly likely, and there is a corresponding high score/higher probability assigned to the flow option. If not found in the dictionary, then this sequence is less likely and a lower probability value is assigned to the flow option.

For the "end of sentence" embodiment, if the last character includes a period ".", then there are two possibilities: the period indicates an end of a sentence, or the period indicates an abbreviation. The last word in the initial text region including the "." is extracted and is looked up against an abbreviation database, in this embodiment. If the last word of the initial text region is found in the abbreviation database, in an embodiment, and if the first word of the target text region begins with a capital letter in this embodiment, then this region flow option is highly unlikely, and a corresponding probability value is assigned to the flow option. In the embodiment where the first word of the target text region does not begin with a capital letter, then this region flow option is more likely, and a correspondingly higher probability value is assigned.

If the last word is not in the abbreviation database, then it may be assumed to be the end of the sentence in this embodiment. When the period is assumed to indicate the end of the sentence, the last word in the initial text region is analyzed to compare the word with a dictionary, and the first letter of the first word in the target text region is analyzed and checked that this first word starts with a capital letter. In an embodiment, if the last word is found in the dictionary and the first word begins with a capital letter in this embodiment, then this region flow option is highly likely, and a corresponding probability value is assigned to the flow option. In the embodiment where the first word is not found in the dictionary and the first word of the target text region does not begin with a capital letter, then this region flow option is less likely, and a correspondingly lower probability value is assigned. A probability value is assigned to the text flow option (i.e. transition) between the initial text region and the target text region in each and every hypothetical text region sequence to be analyzed by the punctuation-based analyzer, in an embodiment.

For the "lack of punctuation" embodiment, if the last character is not a punctuation mark, then the first letter of the first word of the target region is analyzed as if the last word of the initial text region is found in the abbreviation database, in an embodiment.

In an embodiment, output from the punctuation-based analyzer is a set of text flow alternatives or a plurality of alternative reading orders or a plurality of hypothetical text region sequences. In an embodiment, the punctuation-based analyzer may assign such a low probability to hypothetical transitions as to effectively discard a text flow alternative.

In an embodiment, the punctuation-based analyzer may also generate new alternatives by splitting an existing reading order alternative. For instance, the (1, 2, 3, 4, 5) text flow input alternative can be split into (1, 2, 3) (4, 5). In this instance, there are two text region flows in the source page that are not likely to be related to each other, the first text region flow includes (1, 2, 3) and the second text region flow includes (4, 5). These two text region flows may represent two potential separate articles. In an embodiment, new split text flows emerge from the analysis and existing flows possibilities are kept. In another embodiment, the existing reading order alternative that is split is deleted as a possibility.

In an embodiment, a combination of a "scoring" mechanism and a "splitting" mechanism is used. For each transition in a particular reading order alternative, a threshold is defined under which the splitting of the reading order alternative is made and above which the scoring of the reading order alternative is made. For example, for the hyphen rule above, if the concatenated word is found in the dictionary for at least one of the transitions in the reading order alternatives, the scoring method is used on the transitions. However, if the concatenated word is not found in the dictionary for any of the transitions in the reading order alternatives, the splitting method is used such that these transitions are marked as hypothetical separate article sets.

The presentation-based analyzer analyzes body text regions on the source page separately from title text regions, footer text regions, header text regions, and advertisement regions, in an embodiment. In an embodiment, the presentation of body text regions that belong to the same article tend to be the same. In the presentation-based analyzer, font size and font type of each two consecutive text regions in the reading order alternative are analyzed, in an embodiment. In an embodiment, the reading order alternative may be reordered according to a score assigned based on font size and font type similarity. In an addition embodiment, if a difference in font information is detected over a certain threshold between consecutive body text regions, a split in the text flow at that transition can be produced as a replacement or additional reading order alternative.

For example, if two hypothetical consecutive body text regions have the same "Times New Roman" font, at size "10", then the transition is scored more highly than as compared to a transition in which two consecutive regions have the same "Times New Roman" but with different font sizes. Further, for example, the transition between consecutive body text regions with the same font and different font sizes is scored more highly as compared with a transition between body text regions with different font types.

As another example, if two hypothetical consecutive body text regions have the same background color, and/or the same font color, then the transition is scored more highly than as compared to a transition in which two consecutive regions have different font or background colors.

Language Model Analysis

In an embodiment, the language model analysis at block 345 renders a language score calculated by evaluating a probability of a sequence of words across two consecutive body text regions.

In an embodiment, language models are trained with a large volume of similar textual data to generate probabilities associated with n-grams, with n varying from one to three. In an embodiment, the language models create n-gram models that are statistical models to capture a likelihood of a sequence of n words. An n-gram model calculates the probability of a word given the n–1 previous words. In an exemplary embodiment, n-grams are used to evaluate whether a sequence of words are likely to form part of a sentence. For example, end word(s) of a text body region coupled with beginning word(s) of the hypothetical consecutive text body region are analyzed and compared with a database to determine if the coupled words are likely to form part of a sentence.

The n-gram models are created from ground truth text that can be either specific to the application, or it can be generic corpus obtained for English language usage in general, in embodiments. Ground truth is reference data known to be correct. The ground truth may be obtained from text of a specific magazine or book. A hypothesized sequence of words is scored against the n-gram models, wherein the score is normalized (maximum is 100%).

In an embodiment, two-gram (bi-gram) and three-gram (tri-gram) models are selected. In an embodiment, n may be greater than three. In an embodiment, one end "stem" word is selected from the initial body text region and coupled to one beginning "stem" word in the target body text region. The n-gram is compared against the two-gram database, and a score is assigned for matches depending on the likelihood of the match. A "stem" word, in an embodiment, includes a root word, where words with the same root are grouped into a same class.

In an example embodiment, two end "stem" words from the initial text body region are coupled with one beginning "stem" word from the target text body region. In yet another example embodiment, one end "stem" word is coupled with two beginning "stem" words. In each embodiment, the word stem triplet is compared against the trigram models, and a score is assigned for matches depending on the likelihood of the match.

Scores for each text-flow alternative are used to weigh the reading order alternatives against each other, in embodiments of decision combiners discussed herein. In additional embodiments, scores are used to split a text flow (reading order) alternative into two or more text flows (hypothetical article sets) as previously explained. For each transition in a particular reading order alternative, a threshold is defined to decide which of the splitting of the reading order alternative is made. For example, for the part of n-gram model, if the word sequence has a low score for at least one of the transitions in the reading order alternatives, the splitting method is used such that these transitions are marked as hypothetical separate article sets. However, if the word sequence has a high score, for any of the transitions in the reading order alternatives, the scoring method is used on the transitions.

Part of Speech Analysis

The part of speech analyzer at block 355 obtains an n-gram, such as a two-gram or a three-gram, as discussed above, as a concatenated sentence or phrase. Each word in the three-gram is tagged as to a part of speech, such as "noun", "pronoun", "verb", "adjective", "preposition", "conjunction", "exclamation" or "adverb". The three-gram part of speech tag is compared against a database that gives the most frequent combined Part of Speech tags. For example, a "noun-verb" transition is more likely than a "noun-pronoun" transition, and accordingly would be scored higher. Scoring and/or splitting are feasible in embodiments, as discussed herein.

Semantics Analysis

The semantics analyzer at block 365 evaluates a relationship between semantics of each hypothetical consecutive body text region. The text regions used for the semantics analyzer may be from a previous text flow analysis resulting in a plurality of reading order alternatives. For the semantics analyzer, a preset number of topics from a large set of documents are trained into a database. In an embodiment, there are 128 trained topics. Magazine issues of a same kind, and in a same period, or a newspaper, form part of a text corpus used in the database, in an exemplary embodiment.

For a given bag of words, a topic vector is assigned. A bag of words includes a set of words regardless of their order, within a text region. It may be possible to guess the topic of a text region by looking at the words, as opposed to the sentences. In an embodiment, stop words, such as "a" "the" "with", etc. are ignored. In an embodiment, two hypothesized consecutive text regions are scored as likely to be consecutive if the text regions belong to the same topic.

Topic vectors are computed for each of the two hypothesized consecutive text regions. The topic vector gives the probability of the bag of words to be in each of the trained topics. Distance between the topic vectors of the two regions can be computed, for instance, using a dot product. The semantic distance between the two body text regions gives the semantic similarity score. In an embodiment, the topic vector is assigned to the text region based on whether the bag of words includes topics of the trained topics. For a given bag of words, topic vectors are computed using Probabilistic Latent Semantic Analysis (PLSA) techniques and the database, in an embodiment.

Advertisement Analysis

In an embodiment, several analyzers may be used to determine whether one of the identified regions includes an advertisement. In an embodiment, the semantics analyzer is used, for example, when one of the trained topics is not associated with a text region. In another embodiment, the presentation analyzer is used, for example, identifying font type and/or size that is distinguishable from other text regions, and distinguishable within the text region at issue.

Conclusion Detection

The conclusion detection at block 385 aids in determining an end of the article, in an embodiment. In an embodiment, bibliographic information or a reference may be detected by at least one analysis method discussed above, which may indicate an end of an academic article. In an additional embodiment, a specific symbol, such as black box, is detected by at least one analysis method discussed above, which may indicate an end of a commercial magazine article. In yet another embodiment, the method of indicating an end of the article is known and identification of those cues are specifically searched for in order to maximize accuracy of article extraction.

Decision Combiner

Figure 4:
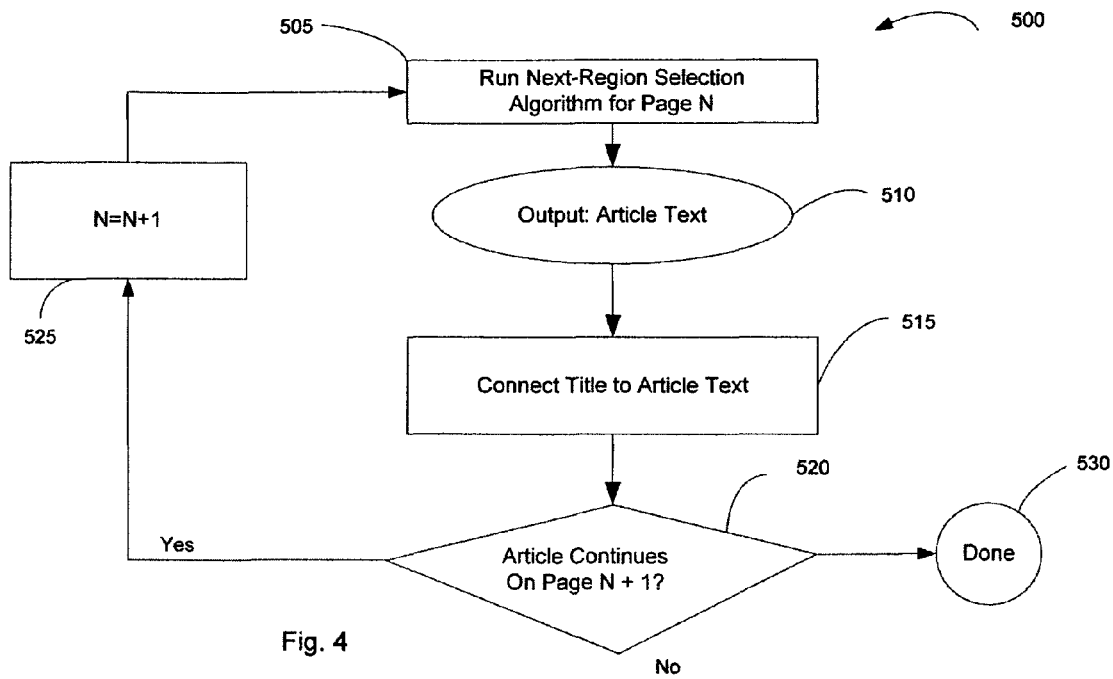
FIG. 4 illustrates an exemplary embodiment of a decision combiner process.
Figure 6:
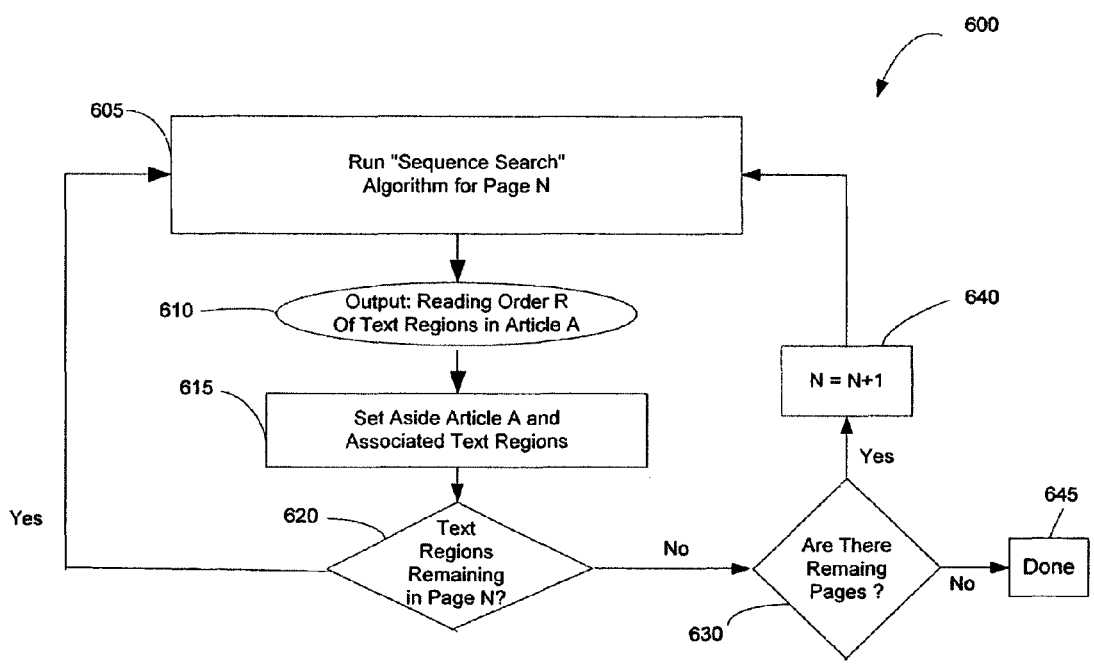
FIG. 6 illustrates an exemplary embodiment of a decision combiner process.
Figure 5:
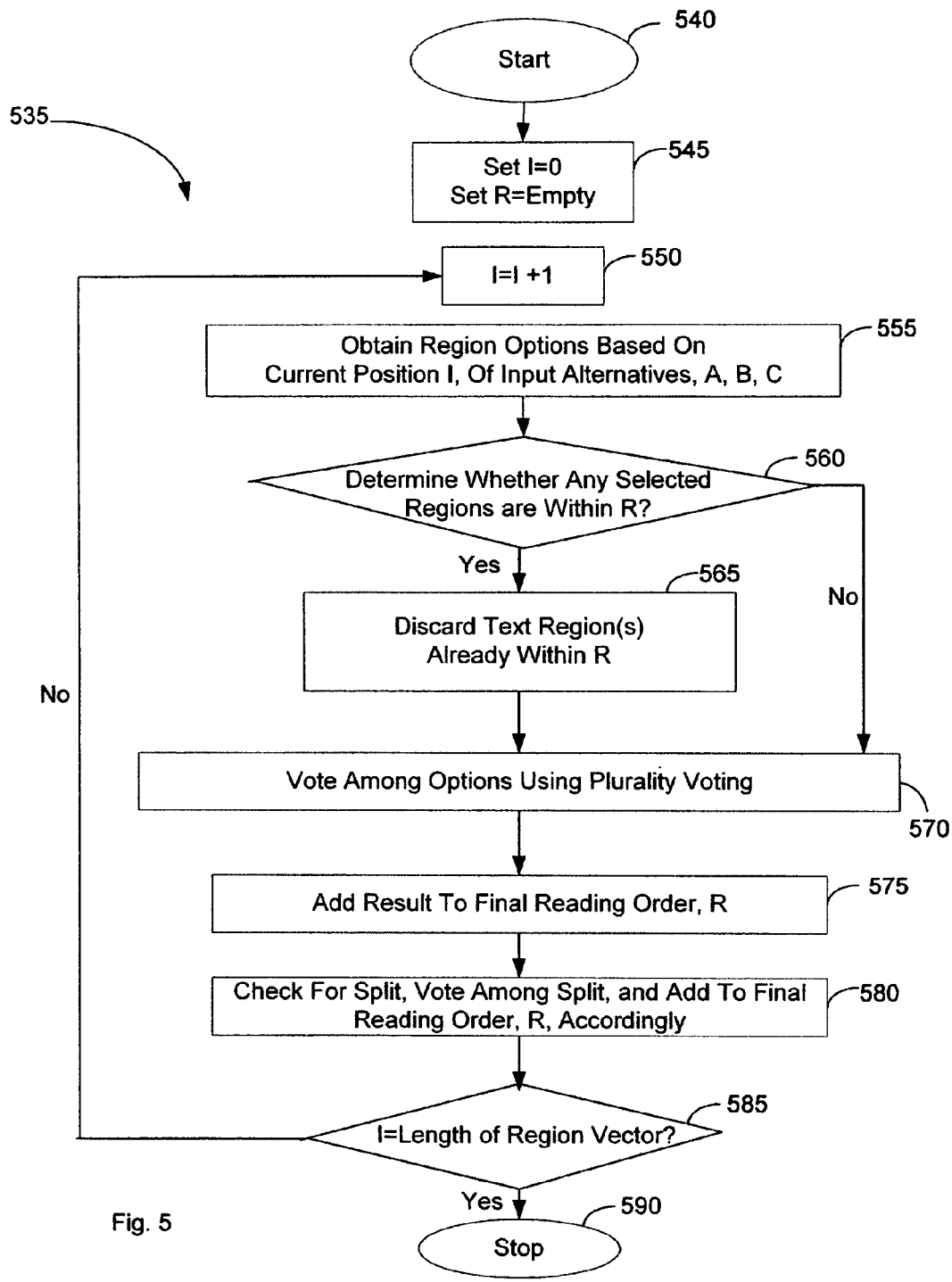
FIG. 5 illustrates an exemplary embodiment of a simple combination algorithm process.
Figure 7:
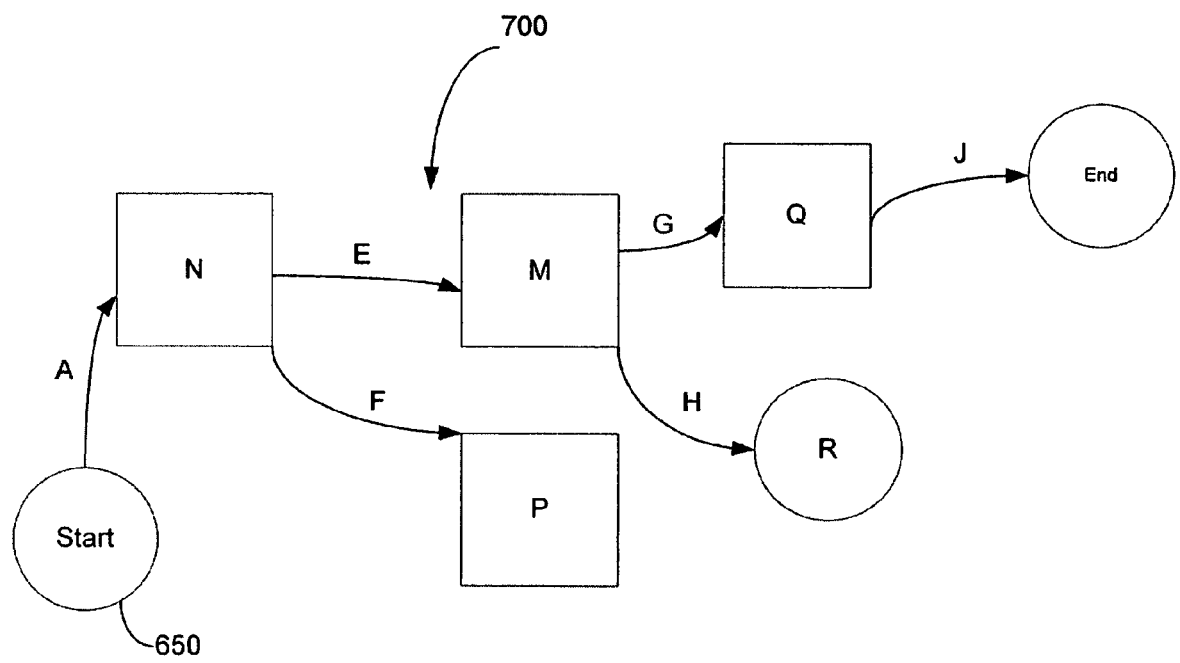
FIG. 7 illustrates an exemplary embodiment of a sequence search algorithm process.

In an embodiment, the decision combiner at block 140 of FIG. 1 processes the plurality of reading order alternatives generated by the text flow analysis to extract a reading order for each article in the document. In an embodiment, the decision combiner includes a simple combination algorithm as shown in the process of FIGS. 4 and 5. In an additional embodiment, the decision combiner includes a sequence search algorithm as shown in the process of FIGS. 6 and 7.

Simple Combination Algorithm Combination Method

FIG. 4 illustrates an embodiment of a decision combiner process 500. The decision combiner includes a simple combination algorithm conducted for a page N at block 505. An exemplary embodiment of the simple combination algorithm is illustrated at FIG. 5. The simple combination algorithm is based on a plurality of reading order alternatives and/or other input generated from the text flow analysis and the region determination discussed above. From the algorithm, an article text includes output at block 510. In an embodiment, the article text is connected to a title at block 515 as discussed herein.

At block 520, a query is made as to whether there is a detection that the article text continues on page N+1. If yes, at block 525, N=N+1, and returns to block 505 to process that page N. If no, at block 530, the process is done.

In an embodiment, the decision combiner at block 505 considers the reading order alternatives, as well as how they are split within each reading order. In an embodiment, the decision combiner may take every region on page N into consideration, and the decision combiner output may include all regions even if they are single regions that are not linked to any other region in the page.

The output at block 510 from the decision combiner includes the reading order found by the algorithm of block 505. The output for each page N includes information about the start for each individual article (or part thereof) identified in the page. For instance, wherein a reading order output includes (1, 2, 4), (3, 5), there are two different articles in page N: (1, 2, 4) and (3, 5). "1" includes the beginning region for the first article of page N and "3" includes the beginning region for the second article of page N. A title is tied to the article at block 515 and a check as to whether the article spans multiple pages is at block 520.

Title text regions identified in previous text flow analyses are obtained. Each starting region (e.g. 1 and 3 in our example) is then measured against the title region using a geometric distance determination and/or a keyword distance determination. In an embodiment, at least one title text region based on at least one of the text flow analysis and the region determination. The at least one title text region is analyzed to couple a title to the extracted article.

A geometric distance from the title text region to a first text region in the extracted article is determined in an embodiment. The geometric distance (GD) is generated using the following formula:

$$GD = \text{square root of } ((Ri_x - Tj_x)^2 + (Ri_y - Tj_y)^2) \text{ where:}$$

$Ri_x$ includes a leftmost point in the first body text region,
$Tj_x$ includes a leftmost point in the title text region,
$Ri_y$ includes a topmost point in the first body text region, and
$Tj_y$ includes a bottommost point in the title text region.

In another embodiment, a keyword distance from the title text region to the first text region in the extracted article is determined. The keyword distance includes: extracting a stem of at least one word in the title text region; extracting a stem of at least one word in at least one of the body text regions; and matching the stem from the title text region with the stem of the at least one body text region.

In an embodiment, some text regions may not be associated with a title text region and vice versa. For embodiments including this one, a manual process may be used to handle any exceptions.

At block 520 of FIG. 4, the process 500 detects whether an article spreads over multiple pages. In some articles, a construct such as "continued on page" indicates the page on which the article is continued. Assuming a reliable page number detection, in an embodiment, that detection is used to identify the destination page to analyze against the source page.

In an embodiment, a 'continued on page' construct at the end of one of the body text regions on the source page is detected. One or more body text regions of a destination page is analyzed as compared with the one or more body text regions of the source page to determine whether there is multi-page text flow. In an embodiment, the analysis is determined using one of the text flow analyses discussed herein.

In an embodiment, each of two consecutive pages (or the source page and the "continued on page" destination page) are analyzed for continued articles. The ending regions from the source page and the starting regions from the destination page are extracted. Analysis of whether the regions are in a reading order proceeds in the same manner as within the same page, in an embodiment.

FIG. 5 illustrates an exemplary embodiment of a simple combination algorithm process 535. At block 540, the process starts. At block 545, in an embodiment, I is set to zero (0), and R is set to empty. I includes a current position of input alternatives, and R includes the final determined reading order. At block 550, I may be set to I+1. At block 555, in an embodiment, text body region options based on the current position, I, of input alternatives (A, B, and C) are obtained. At block 560, a query as to whether there are any selected regions that are already within R is determined. If yes, then at block 565, that text region already within R is discarded in the voting of block 570. If no, then the process moves directly to block 570 to choose among the text body regions obtained in block 555, using plurality voting in an embodiment. At block 575, the result of block 570 is added to the final reading order, R. At block 580, check for split, and choose among the split, if there is a split, including voting for instance, and add the split (if existing and voted upon favorably) to the final reading order, R accordingly. At block 585, query as to whether I=length of region vector. If no, then return to block 550. If yes, then stop at block 590.

In an exemplary embodiment of the decision combiner of FIGS. 4 and 5, consider the following reading order alternatives for FIG. 2 as obtained from three reading order analyzers: A: (1, 2, 3, 4, 5); B: (1, 2, 4) (3, 5); and C: (1, 3, 4) (2, 5).

At block 540, the process starts.

At block 545, I is set to zero (0), and R is set to empty.

At block 550, I is set to I+1=1. The current position includes 1.

At block 555, at the current position 1, for each reading order alternative A, B, and C, the selected body text region for the first position include "1".

At block 560, no selected regions (i.e. "1") are already within R. Therefore, skip block 565.

At block 570, voting among the options (i.e. "1", "1", and "1") is conducted. "1" wins.

At block 575, the result is added to the final reading order, R. R=(1).

At block 580, a split is checked, and there is no split indicated in any of the input alternatives, in this embodiment.

At block 585, the query is whether I is greater than a length of region vector. The length of the region vector is 5, for 5 text regions in the reading order alternatives. I=1, which is less than 5. Therefore, the answer to the query is no, and the process returns to block 550.

At block 550, I=I+1. Therefore, I=2.

At block 555, when I=2, the regions at the $2^{nd}$ position include: "2", "2" and "3" for A, B, and C, accordingly.

At block 560, neither "2" nor "3" are already within R, which currently only includes "1". Therefore, block 565 is skipped.

At block 570, voting is conducted among "2", "2" and "3". "2" wins.

At block 575, the result is added to the final reading order, R. R=(1, 2)

At block 580, no split detected.

At block 585, I=2, which is less than 5. Return to block 550.

At block 550, I=3.

At block 555, the regions at the $3^{rd}$ position include: "3", "4" and "4".

At block 560, neither "3" nor "4" are included in R=(1, 2).

At block 570, "4" wins in the vote.

At block 575, R=(1, 2, 4)

At block 580, there is no split between the second and third positions.

At block 585, I=3, which is less than 5. In an embodiment, the process moves to block 550.

At block 550, I=4.

At block 555, at $4^{th}$ position, the text regions include: "4", "3", and "2".

At block 560, selected regions 4 and 2 already exist in R.

At block 565, selected regions 4 and 2 are not considered and 3 remains.

At block 570, after voting, "3" is selected as the $4^{th}$ position.

At block 575, R=(1, 2, 4, 3)

At block 580, a split is detected between the $3^{rd}$ and $4^{th}$ positions.

Voting among split (A=no split, B=split, C=split).

Therefore, R=(1, 2, 4) (3)

At block 585, I=4, which is less than 5.

At block 550, I=5.

At block 555, at the current position 5, for each reading order alternative A, B, and C, the selected body text region for the first position include "5".

At block 560, no selected regions (i.e. "5") are already within R. Therefore, skip block 565.

At block 570, voting among the options (i.e. "5", "5" and "5") is conducted. "5" wins.

At block 575, the result is added to the final reading order, R=(1, 2, 4) (3, 5).

At block 580, a split is checked, and there is no split indicated in any of the input alternatives, in this embodiment.

At block 585, I=5. Goto block 590.

At block 590, process is done.

Sequence Search Algorithm Combination Method

FIG. 6 illustrates an embodiment of a decision combiner process 600. In an embodiment, at block 605, the decision combiner includes a sequence search algorithm that considers each reading order alternative generated and considers an assigned probability to each hypothetical transition in the plurality of reading order alternatives for page N. The embodiment of FIG. 6 illustrates a dynamic programming algorithm that searches the most likely sequence of text regions to determine an optimal reading order alternative to form the article. FIG. 7 illustrates an exemplary embodiment of the decision combiner at block 605 of FIG. 6.

At block 610, the decision combiner of block 605 outputs a reading order R of text regions in article A. At block 615, article A and associated text regions are set aside. Each page is searched again for another article until each of the articles in the page N is extracted. Then each page of the document is searched in the same manner until all the articles are extracted. At block 620, a query is made as to whether any text regions are remaining in page N after article A (and any previous articles of page N) is set aside. If yes, then the process moves to block 605 to repeat the process for the remainder of the articles in page N. If no, then the process moves to block 630. At block 630, a query is made as to whether there are any remaining pages in the document. If yes, then the process moves to block 640 wherein N=N+1, and the process then moves to block 605 to repeat. If no, then the process moves to block 645, and the process is done.

In an additional embodiment, not illustrated, image regions may be considered. In another embodiment, the image regions are discarded.

FIG. 7 illustrates an exemplary embodiment of a sequence search algorithm process 700. A graph is constructed, and starts from a hypothetical root node representing the start of an article at node 650. The nodes of the graph correspond to the text regions generated by the layout analyzer. The arcs between the nodes represent the hypothesized transitions between regions from the text flow analyzers, in an embodiment. Each transition between regions is scored in the text flow analysis, evaluating the probability of the transition from one region to the following one, in embodiments. The transition score may be a combination of several scores evaluated on relative properties of the regions, in embodiments. Possible transition scores include those from title detection analysis, layout-based analysis, presentation-based analysis, language model analysis, semantic analysis, and conclusion detection analysis, although other analyses listed herein or not may be used.

In FIG. 7, a first particular transition E between an N body text region in a first reading order alternative and a hypothetical sequential M body text region in the first reading order alternative is scored based on the text flow analysis in terms of probability. A second particular transition F between the N body text region in a second reading order alternative and a hypothetical sequential P body text region in the second reading order alternative is scored based on the text flow analysis in terms of probability.

The probabilities of the first transition E and the second transition F are compared, in this embodiment. The particular transition with a higher probability score is chosen as part of a determined reading order in an article of the document. In an embodiment, transition E is chosen.

A probability or score of a third particular transition G between the M body text region in the first reading order alternative and a hypothetical sequential Q body text region in the first reading order alternative is evaluated. A probability or score of a fourth particular transition H between the M body text region in a third reading order alternative and a hypothetical sequential R body text region in the third reading order alternative is evaluated. The score is summed from the first particular transition E with the score from the third particular transition G. The score is also summed from the first particular transition E with the score from the fourth particular transition H, in this embodiment. The summed scores are compared. The transition with a higher score as part of the determined reading order in the article is chosen. In an embodiment, the optimal reading order includes: (Start, N, M, Q, End).

In an embodiment, the generating, the scoring, the comparing, and the choosing may be repeated until the reading order in the article is determined. As described with reference to the embodiment of block 615, the chosen body text regions associated with the determined reading order in the article from the algorithm may be removed. When removed, the generating, the scoring, the comparing, and the choosing may be repeated until each article in the document is determined. In an embodiment, the sequence forming a single article may be searched at block 605 and the sequence is output at block 610. The sequence may be removed from the set at block 615. The search may be conducted again on the remaining regions in page N at block 605, if the answer to the query at 620 is no. The search algorithm can be conducted within each page, and then across pages on the resulting (page) sequences, or directly across all pages of the same document in embodiments.

In other embodiments, the sequence search algorithm illustrated in the exemplary embodiment of FIG. 7 may have more scores or probabilities to consider and compare at each transition.

A means for generating a plurality of separate body text regions includes the region determination of each page of a document, in an embodiment. A means for generating a plurality of reading order alternatives of the plurality of separate body text regions includes each of the text flow analyses, taken alone or in combination, in an embodiment. A means for processing the plurality of reading order alternatives to extract a reading order for each article in the document includes the decision combiner, in an embodiment.

FIGS. 1 to 7 are merely representational and are not drawn to scale. Certain proportions thereof may be exaggerated, while others may be minimized. Many other embodiments will be apparent to those of skill in the art upon reviewing the above description. Parts of some embodiments may be included in, or substituted for, those of other embodiments. While the foregoing examples of dimensions and ranges are considered typical, the various embodiments are not limited to such dimensions or ranges.

The illustrations of embodiments described herein are intended to provide a general understanding of the structure of various embodiments, and they are not intended to serve as a complete description of all the elements and features of apparatus and systems that might make use of the structures described herein. The accompanying drawings that form a part hereof show by way of illustration, and not of limitation, specific embodiments in which the subject matter may be practiced.

Applications that may include the apparatus and systems of various embodiments broadly include a variety of electronic and computer systems. The elements, materials, geometries, dimensions, and sequence of operations can all be varied to suit particular packaging requirements.

Embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of embodiments herein may be made without departing from the principles and scope of embodiments as expressed in the subjoined claims.

What is claimed is:

1. A method executed by a computer, the method comprising:
   in a document including multiple articles, determining, by the computer, a layout structure that separates text regions from graphic regions on each page of the document;
   determining, by the computer, where each of the articles begins and each of the articles ends to distinguish the articles from each other;
   extracting, by the computer, the articles from the document using text flow analysis to generate a plurality of reading order alternatives of separate body text regions;
   evaluating, by the computer, topics discussed in the separate body text regions to generate a first score that indicates whether the separate body text regions belong to a same article;
   evaluating, by the computer, punctuation in first and last sentences in the separate body text regions to generate a second score that indicates whether the separate body text regions belong to the same article;
   using, by the computer, a decision combiner to process the first and second scores and the plurality of reading order alternatives to determine which of the separate body text regions belong to the same article; and
   outputting, by the computer, an extracted article from the document.

2. The method of claim 1 further comprising, assigning a topic vector to each of the separate body text regions, and determining a distance between two of the topic vectors to determine whether two consecutive separate body text regions belong to the same article.

3. The method of claim 1 further comprising, comparing a last word or last character of a last line in a first separate body text region with a first word in a second separate body text region to determine whether the first and second separate body text regions belong to the same article.

4. The method of claim 1 wherein the punctuation includes an end of sentence indicator.

5. The method of claim 1 wherein the text flow analysis includes one or more of a layout-based analysis, a part of speech analysis, a language model analysis, a table of contents analysis, an advertisement analysis, a presentation analysis, a punctuation-based analysis, and a semantic analysis, wherein a start transition analysis is based on title detection of the extracted article, and an end transition is based on conclusion detection of the extracted article.

6. The method of claim 1 wherein the text flow analysis includes one or more of a layout-based analysis, a part of speech analysis, a language model analysis, a table of contents analysis, an advertisement analysis, a presentation analysis, a punctuation-based analysis, and a semantic analysis, wherein the language model analysis is based on an n-gram analysis, wherein the n-gram includes one of a 2-gram, a 3-gram, and an n-gram with n greater than 3.

7. A method being executed by a computer, the method comprising:
   separating, by the computer, a plurality of separate body text regions from a plurality of separate body graphic regions for each page of a document that includes plural different articles;
   generating, by the computer, a plurality of reading order alternatives of the plurality of separate body text regions with a text flow analysis;
   evaluating, by the computer, topics discussed in two consecutive separate body text regions to determine whether the two consecutive separate body text regions belong to a same article;
   comparing, by the computer, punctuation marks between the two consecutive separate body text regions to determine whether the two consecutive separate body text regions belong to the same article;
   applying, by the computer, a decision combiner to process the plurality of reading order alternatives to extract a reading order for each article in the document; and
   determining, by the computer, a beginning and an end for the articles to extract different articles from the document.

8. The method of claim 7 further comprising, assigning topic vectors to the two consecutive body text regions, and determining a distance between the topic vectors to determine whether the two consecutive body text regions belong to the same article.

9. The method of claim 7 further comprising, comparing a last word or last character in a first of the two consecutive body text regions with a first word or first character in a second of the two consecutive body text regions to determine whether the two consecutive body text regions belong to the same article.

10. The method of claim 7 wherein the punctuation marks include end of sentence indicators and word splits.

11. The method of claim 7 further comprising generating at least one title text region based on the text flow analysis; and analyzing the at least one title text region to couple a title to the extracted article.

12. The method of claim 11 wherein generating the at least one title text region includes at least one of:
   determining a geometric distance from the title text region to a first text region in the extracted article; and
   determining a keyword distance from the title text region to the first text region in the extracted article.

13. The method of claim 12 wherein the geometric distance (GD) is generated using the following formula:

$$GD = \text{square root of } ((Ri_x - Tj_x)^2 + (Ri_y - Tj_y)^2) \text{ where:}$$

$Ri_x$ includes a leftmost point in the first body text region,
$Tj_x$ includes a leftmost point in the title text region,
$Ri_y$ includes a topmost point in the first body text region, and
$Tj_y$ includes a bottommost point in the title text region.

14. The method of claim 12 wherein the keyword distance includes:
   extracting a stem of at least one word in the title text region;
   extracting a stem of at least one word in at least one of the body text regions; and
   matching the stem from the title text region with the stem of the at least one body text region.

15. The method of claim 7 further comprising detecting a continued-on-page construct at an end of one of the body text regions on a source page; and analyzing one or more body text regions of a destination page as compared with the one or more body text regions of the source page to determine multi-page text flow.

16. The method of claim 7 further comprising detecting a consecutive destination page; and analyzing one or more starting regions of the consecutive destination page as compared with one or more ending regions of a source page to determine multi-page text flow.

17. The method of claim 7 comprising:
   wherein applying the decision combiner includes:
   scoring a first particular transition between an N body text region in a first reading order alternative and a hypothetical sequential M body text region in the first reading order alternative based on the text flow analysis in terms of probability;
   scoring a second particular transition between the N body text region in a second reading order alternative and a hypothetical sequential P body text region in the second reading order alternative based on the text flow analysis in terms of probability;
   comparing probabilities of the first and second particular transitions; and
   choosing and storing the particular transition with a higher probability score as part of a determined reading order in an article of the document.

18. The method of claim 17 further comprising:
   repeating the generating, the scoring, the comparing, and the choosing until the reading order in the article is determined;
   removing the chosen body text regions associated with the determined reading order in the article; and
   repeating the generating, the scoring, the comparing, and the choosing until each article in the document is determined.

19. The method of claim 17 wherein each of the plurality of reading order alternatives identifies one or more hypothetical article sets, the method further comprising considering whether there are one or more hypothetical article sets in choosing the determined reading order in the article.

20. The method of claim 17 further comprising comparing the probabilities of the first and second particular transitions with a third particular transition in a third reading order.

21. The method of claim 17 wherein the first particular transition has a higher score than the second particular transition, the method further comprising:
   evaluating a probability of a third particular transition between the M body text region in the first reading order alternative and a hypothetical sequential Q body text region in the first reading order alternative;
   evaluating a probability of a fourth particular transition between the M body text region in the third reading order alternative and a hypothetical sequential R body text region in the third reading order alternative;
   summing the score from the first particular transition with the score from the third particular transition;
   summing the score from the first particular transition with the score from the fourth particular transition;
   comparing the summed scores; and
   choosing the transition with a higher score as part of the determined reading order in the article.

22. Computer executable instructions stored in memory of a computer and executable by the computer to perform a method comprising:
   separating, by the computer, a plurality of separate body text regions from a plurality of separate body graphic regions on multiple pages of a document to determine a layout structure of the multiple pages;
   generating, by the computer, a plurality of reading order alternatives from the plurality of separate body text regions for each page of the document that includes multiple different articles;
   evaluating, by the computer, topics discussed in the separate body text regions to generate a first score that indicates whether the separate body text regions belong to a same article;
   evaluating, by the computer, punctuation marks of first and last sentences in the separate body text regions to generate a second score that indicates whether the separate body text regions belong to the same article;
   evaluating, by the computer, the first and second scores to determine a beginning and an end for each article in the document to extract different articles from the document; and
   processing, by the computer, the plurality of reading order alternatives to extract a reading order for each article in the document.

23. The method of claim 22 wherein the generating includes at least one of a region determination and a text flow analysis, wherein the text flow analysis includes one or more of a layout-based analysis, a part of speech analysis, a language model analysis, a table of contents analysis, an advertisement analysis, a presentation analysis, a punctuation-based analysis, and a semantic analysis.

24. The method of claim 22 wherein the processing includes a decision combiner, wherein each of the plurality of reading order alternatives identifies one or more hypothetical article sets, wherein the decision combiner considers each reading order alternative generated, whether there are one or more hypothetical article sets; and considers an assigned probability to each hypothetical transition in the plurality of reading order alternatives.

25. A computer-readable storage medium being stored on a computer and having instructions for causing the computer to execute a method, the method comprising:

a plurality of separate body text regions separated from a plurality of separate body graphic regions generated by a region determination of each page of a document that includes plural different articles;

a plurality of reading order alternatives generated by a text flow analysis of the plurality of separate body text regions, wherein the text flow analysis evaluates topics discussed in the separate body text regions to determine whether the separate body text regions belong to a same article, compares end of sentence indicators between two consecutive separate body text regions to determine whether the two consecutive separate body text regions belong to the same article, and determines beginnings and ends for the plural different articles and each of the plurality of reading order alternatives identifies one or more hypothetical article sets; and an algorithm to process each of the plurality of reading order alternatives and the one or more hypothetical article sets to generate a reading order of an article in the document and extract the article from the plural different articles in the document.

26. The computer-readable storage medium of claim 25 wherein the algorithm compares a last word or last character of a last line in one of the two consecutive separate body text region with a first word in a second of the two consecutive separate body text region to determine whether the two consecutive separate body text regions belong to the same article.

27. The computer-readable storage medium of claim 25 wherein the algorithm includes a sequence search algorithm to consider an assigned probability to each hypothetical transition between consecutive body text regions in the plurality of reading order alternatives.

28. The computer-readable storage medium of claim 25 wherein the text flow analysis includes one or more of a layout-based analysis, a part of speech analysis, a language model analysis, a table of contents analysis, an advertisement analysis, a presentation analysis, a punctuation-based analysis, and a semantic analysis.

* * * * *

UNITED STATES PATENT AND TRADEMARK OFFICE
CERTIFICATE OF CORRECTION

| | |
|---|---|
| PATENT NO. | : 7,756,871 B2 |
| APPLICATION NO. | : 10/964094 |
| DATED | : July 13, 2010 |
| INVENTOR(S) | : Sherif Yacoub et al. |

It is certified that error appears in the above-identified patent and that said Letters Patent is hereby corrected as shown below:

In column 18, line 62, in Claim 24, delete "sets;" and insert -- sets, --, therefor.

Signed and Sealed this

Ninth Day of November, 2010

David J. Kappos
*Director of the United States Patent and Trademark Office*